March 18, 1969 E. PLESS 3,433,905

TAPE RECORDER CARRYING AND COUPLING BELT ASSEMBLY

Filed April 16, 1965

INVENTOR.
ERNST PLESS
BY McGlew and Toren
Attorneys

United States Patent Office 3,433,905

Patented Mar. 18, 1969

3,433,905

TAPE RECORDER CARRYING AND COUPLING BELT ASSEMBLY

Ernst Pless, Vienna, Austria, assignor to Akustische u. Kino-Gerate Gesellschaft m.b.H., Vienna, Austria Filed Apr. 16, 1965, Ser. No. 448,792
Claims priority, application Austria, Apr. 28, 1964, A 3,769/64
U.S. Cl. 179—157 5 Claims
Int. Cl. H04m *1/02*

ABSTRACT OF THE DISCLOSURE

A carrying and coupling belt assembly for a sound transducer such as a tape recorder includes a combination supporting an electrical coupling belt having electrical conductor means therein for electrically connecting the electrical circuitry of the tape recorder to an external apparatus such as a microphone and also for supporting the recorder on the user's shoulder. The coupling belt includes connecting means for mechanically and electrically connecting one end of the belt to the tape recorder and it carries a control housing intermediate its length with control means in the housing electrically connected to the conductor means in the belt for connecting the microphone to the tape recorder. The control housing also includes a modulation control and an indicator and a microphone and recorder on and off switch. In one form, the control housing has a cover which is hinged in a manner such that it may be pivoted downwardly to a horizontal position for easily viewing the modulation indicator thereon. The housing includes a base portion which is formed integral with the belt and a removable portion which permits the mounting of the control removable portion on a tripod, for example.

This invention relates in general to sound transducing devices, and in particular to a new and useful portable sound recording and reproducing device having a combination supporting and electrical coupling belt therefor with means for selectively coupling a microphone in one or more manners.

The continual advances in the miniaturization of electro-acoustic and electronic components and particularly the use of transistors have enabled the manufacture of tape recorders which are so small that they can be considered portable. This enables a recording of running commentaries on the spot, where the background noise contribute to an acoustic picture which is more impressive than any subsequent account. Another advantage of these portable tape recorders, which are battery-operated, resides in that they are universal in application for outdoor or indoor recording, e.g., as a dictating apparatus. This is particularly useful for amateurs.

Such tape recorders obviously need various cables in order to meet all requirements. Above all, a microphone cable is required, also a remote control cable having a plurality of conductors, and in most cases a cable for recording broadcasts (via the diode connection of the radio receiver) and for reproducing the tape recording with the aid of a radio receiver or an amplifier. It is difficult for the user of the tape recorder to carry all these cables with himself because the tape recorder cannot accommodate accessories in most cases when it has the small size which is desired. If the cables are kept in a separate bag, they tend to entangle so that they can be separated only with difficulty. In practical operation, a plurality of cables lying around are also undesirable because they do not contribute to a clear arrangement.

Besides, one or the other cable of a plurality of separate cables may easily be forgotten or left back for convenience so that the tape recorder cannot be used for unforeseen modes of operation.

It is an object of the invention to simplify the use of portable tape recorders. This object is accomplished in that at least some of the cables required for various modes of operation are combined in a belt, which is used as a carrying belt and provided with plug means at one end or both ends, and is further provided with a housing, which is disposed on the chest when the tape recorder is carried from the shoulder, and comprises switches, controls and the like, which are permanently connected to the electrical conductors incorporated in the belt.

According to another feature of the invention, the housing mounted on the belt is provided with plug means for connection to a microphone so that the microphone need not be held in the hand but can be carried directly on the body, like a Lavalier microphone. According to a further feature of the invention, the housing mounted on the belt comprises a modulation control element and modulation indicator, e.g., in the form of a small instrument with a pointer, so that the housing enables both a control and supervision of all functions of the tape recorder.

To prevent a dangling or even tearing of unused plugs when the tape recorder is being carried, the tape recorder is provided according to the invention with so-called dead sockets, which are not connected to the electric circuits of the tape recorder.

According to another feature of the invention, that portion of the belt which lies on the shoulder from which the tape recorder is carried is provided with a rough, anti-slip surface. This is of special significance when the tape recorder is not carried in the usual manner, in which the belt extends like a shoulder belt across the chest and back, but is carried only on one side from the shoulder.

In order to attach the belt to the tape recorder by means which will resist all tensile stresses, it is proposed according to the invention to provide the belt on both sides with branched straps, which may be provided in the simplest case with button-holes, which are applicable to buttonlike projections on both sides of the tape recorder, to enable an adjustment of the length of the belt to the size of the wearer. One or both of these straps may be relatively long and provided with a series of button-holes lying one over the other. Instead of such a simple arrangement, one or two specially designed, releasable clamps may be provided on both sides of the tape recorder and these clamps may grip the straps or directly the carrying belt in a desired position.

According to another feature of the invention, the housing which is carried by the belt and which is in a suitable position on the chest when the tape recorder is being carried from the shoulder consists of a base and a top. The base is firmly connected to the belt whereas the top is pivotally and, if desired, detachably connected to the base. This has the advantage that the housing which is carried by the belt is entirely smooth when the apparatus is not used because all knobs, switches and, if desired, also the modulation indicator will be arranged so that they are accessible only when the top has been swung off. Such an arrangement may be obtained in various ways. For instance, when the housing consists of a drop cover, which can be swung down so that the inside faces upwardly, all controls and switches can be accommodated in the hollow top. Alternatively, the top may be hinged at its lower end; in this case the control knobs, etc., must protrude from the top of the housing. Finally, the top could be arranged to swing open laterally; in this case the advantage afforded by the two other arrangements described hereinbefore and residing in the easy supervision of the switches and controls mounted in the top, cannot be obtained.

According to another feature of the invention, the top of the housing with all controls, switches, etc., may be removed from the base, to which it is connected, e.g., by plug and socket means. These are designed so that the plug mounted at the free end of the belt can also be inserted into the socket in the housing top. If the top is further provided with a screw threaded for a threaded connection to a stand, or with another means for securing the housing top to a stand, a stationary set-up may be provided, which can be controlled from the location of the microphone because the latter can be inserted into the housing top.

Compared to a known suggestion to accommodate a cable in a longitudinal slot of the belt, the invention has some significant advantages, which have briefly been referred to hereinbefore. More particularly, the invention eliminates the need for special containers for carrying the cables. A special advantage resides in the fact that the cables cannot entangle and that it is not necessary to select and connect all cables at the location where the tape recorder is to be used but it is sufficient to insert the microphone either into the single free plug at one end of the belt or into the free plug of the housing mounted on said belt. When a recording or reproduction with the aid of a radio receiver or a re-recording from one tape recorder to another is desired, the same plug is used as for a recording with the aid of a microphone. As the plugs are always multipolar, a suitable wiring of certain plug pins can provide for the required difference between the connections to the tape recorder. Thus, the belt used for carrying the tape recorder represents essentially a wiring network, which includes all switching, controlling and indicating means required for the operation and control of the tape recorder.

Accordingly, it is an object of this invention to provide a combination supporting and electrical coupling belt for use with a sound transducing device such as a portable tape recorder and reproducing machine.

A further object of the invention is to provide a combination of a recording or reproducing device with a belt for supporting the device from a person and for electrically coupling the device to an element such as a microphone and which advantageously includes a control means electrically connected to the conductors in the belt having elements for actuating the device and for mounting and electrically connecting a microphone.

A further object of the invention is to provide an electrical coupling and supporting belt for a recording or reproducing device which includes electrical terminals for connecting the device to a recording or reproducing unit and to a microphone and constructed in a manner which will permit the belt to be used for supporting the device over the shoulder of a wearer or for mounting a microphone on a stand or a table location, as desired.

A further object of the invention is to provide a sound transducer with a combination electrical coupler and supporting belt therefor which are simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings in which there are illustrated and described preferred embodiments of the invention.

Figures 1, 2, 3, 4, 5, 6:
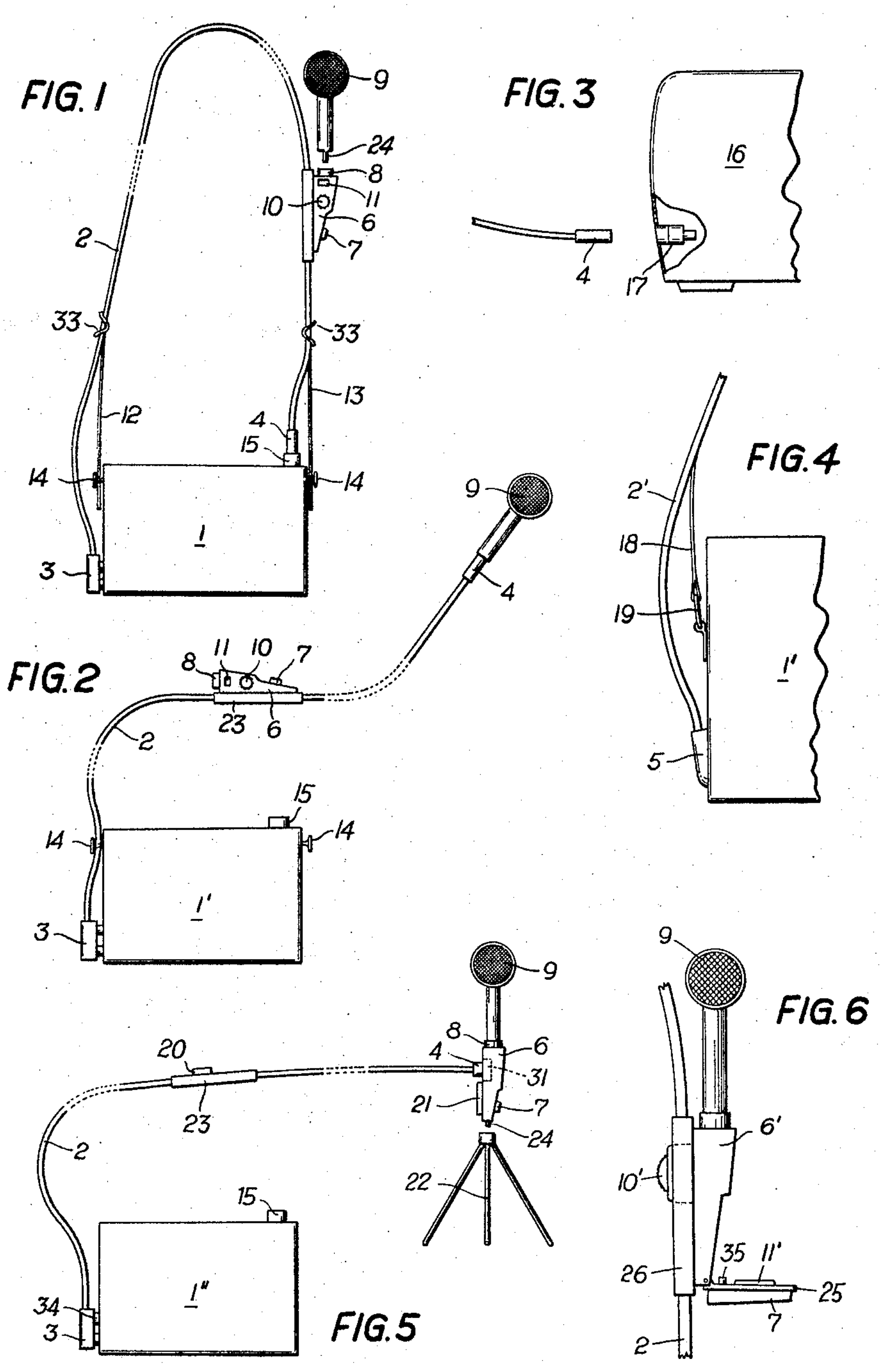
FIG. 1 is a side elevational view of a tape recorder having a combination supporting and electrical coupling belt constructed in accordance with the invention.
FIG. 2 is a view similar to FIG. 1, but with the tape recorder resting on a table and connected to a microphone.
FIG. 3 is a partial side elevational and view of a radio showing the connection for the coupling belt terminal.
FIG. 4 is a partial side elevational view of another embodiment of recorder with an arrangement for attaching the belt to the recorder.
FIG. 5 is a view similar to FIG. 4, in which the control housing includes a removable portion.
FIG. 6 is a side elevational view of another embodiment of the control housing.

In accordance with the invention as indicated in FIG. 1, a recording and reproducing device such as a tape recorder generally designated 1 is provided with a combination supporting and electrical coupling strap or belt 2 by which the recorder can be carried from the shoulder of a person. This strap contains a plurality of flexible electrical conductors (not shown) which are insulated from each other and some of which may be shielded. Modern technology enables the manufacture of such belts provided with electrical conductors of the kind described without difficulty so that the manufacture of the belt need not be described more fully. The material used for insulating and carrying the conductors will preferably consist of one of the large number of suitable synthetic thermoplastic materials which are available.

The electrical conductors embedded in the belt extend to plug means which may advantageously be provided at one end or both ends of the belt. In the embodiment illustrated in FIG. 1 the plug means includes a plug or terminal 4, which serves as a microphone plug, as a plug for use during a recording or reproduction with the aid of a radio receiver, or for connection to a second loudspeaker. The necessary distinction between the different modes of operation is provided for in the plug 4 by a suitable wiring of the plug pins (not shown) and the socket contacts in the above-mentioned units cooperating with the tape recorder 1. Another plug 3 may be provided at the other end of the belt 2 to make the necessary connections to the circuits of the tape recorder. The plug at this point may be omitted, if desired, and the end of the belt may extend through a lead-in sleeve 5 directly into the interior of the tape recorder 1', as is indicated, e.g., in FIG. 4.

A control means including a housing 6 is permanently connected to the coupling belt 2 and in the simplest case is provided with a switch 7 and terminal means such as a plug or socket 8 receivable by a corresponding plug or socket 9' of a microphone 9. When the tape recorder is properly carried from the shoulder in operation, the housing 6 is disposed on the chest of the wearer so that the microphone 9 fitted on the plug 8 can be carried on the body of the wearer like a Lavalier microphone. As a result, both hands of the operator are free and he can record a running commentary even when he needs his hands, e.g., to hold himself (on climbing paths, on ships, on tall buildings or when driving a car).

To increase the field of application of the apparatus according to the invention and to simplify the operation thereof, the housing 6 secured to the belt 2 incorporates suitably a mode selector switch (not shown) for the tape recorder, one or more control elements for use during recording and reproduction, e.g., a modulation control element 10, and, if desired, a modulation indicator 11. In view of the small size of modern switches and controls, the housing 6 is small in size so that it is not disturbing although it constitutes a complete control unit for the tape recorder.

To enable a carrying of the tape recorder without danger to the plug and socket connections and to prevent a falling of the tape recorder 1 when the plugs 3 and 4 have become loose, the belt 2 is connected at spaced locations from each end in the embodiment shown in FIG. 1 with auxiliary supporting or reinforcing means comprising two straps 12, 13. These straps 12, 13 are provided in known manner with button-holes at their respective one ends, which receive buttonlike projections 14 on both sides of the tape recorder 1.

The straps 12, 13 may be connected to the belt by buckles 33 similar to the belt buckles, which are fixed to the straps and in frictional engagement with the belt, which is threaded through the buckles. This arrangement enables an adjustment of the effective length of the belt. For the same purpose, the straps 12, 13 may be provided with a plurality of buttonholes arranged along the length thereof for selective engagement with the projections 14.

When the tape recorder is out of operation or in transit, the plug 4 is inserted into a dead socket 15 in the tape recorder to prevent damage to the plug.

FIG. 2 illustrates the use of the tape recorder 1', according to the invention, on a table. The housing 6 rests now on the table top and its controls and switches serve for controlling the tape recorder just as when the same is operated while being carried from the shoulder. In this case the microphone 9 is connected to the plug 4, which is disposed at one end of the belt.

FIG. 3 shows the connection of the tape recorder according to the invention to a radio receiver for recording or reproduction. As has already been mentioned, the plug 4 is used for this purpose and is inserted into the suitably wired socket 17 of the radio receiver 16.

FIG. 4 shows a detail which relates to the fixation of a belt 2' when the electrical conductors of the belt are not connected to the tape recorder 1' by a plug as shown at 3 in FIG. 1 but extend directly into the interior of the tape recorder 1 through the lead-in sleeve 5.

A strap 18 extends from the coupling belt 2 like the straps 12 and 13 in the embodiment shown in FIG. 1 and hangs in a carrying ring 19, which is secured to the tape recorder 1' by a bracket in known manner. With this fixation, the terminals of the conductor ends extending through the sleeve 5 are entirely relieved from tension.

Within the scope of the invention, other means may be used for fixing the coupling belt according to the invention. For instance, clamps may be provided on both sides or only on one side of the tape recorder and may comprise a cross-bar or toggle and grip either the belt, which is of increased thickness at this point, or one of the straps described hereinbefore, which extend from the belt. Finally, the plugs may also be provided with a strongly dimensioned tension-relieving means and with locking means for preventing an unintended pulling of the plugs so that the load is taken up only by the plugs when the tape recorder is being carried.

A particularly desirable development of the invention is shown in FIG. 5. In this illustrative embodiment the housing 6 is provided with a detachable portion or base 23, which remains always attached to the belt or is firmly connected to it in a unit. The base 23 comprises a plug 20 which co-acts with a mating socket 31 in the housing 6. The socket 31 in the housing 6 can also receive the plug 4 at the free end of the carrying belt. A clamp or, in the simplest case, a screw thread 24 may be provided for a connection to a stand or tripod 22 so that the housing part 6 can be mounted securely. The terminal means 8 at the top of the housing 6 provides electrical connection and coupling for the microphone 9. In this way, a stationary electro-acoustic system is obtained, which can be controlled from the location of the microphone 9 and which avoids entangling cables. If the belt 2 is found too short in such cases, a similar extension may be provided and may be connected at one end to the plug 4 and at the other end to the housing 6. In this case, too, entangling cables or wires are entirely avoided.

If the fixation of the housing 6 to the base 23 by the plug and socket connection is not sufficient, a separate clamp 21 may be provided for connecting the two parts.

In FIG. 5, the lower pin of the plug member 3 is connected to the mating socket in the tape recorder 1'' by a bayonet joint (not shown in detail). The plug 4 and the dead socket 15 are also designed to coact like a bayonet joint.

In the embodiment shown in FIG. 6, there is provided a control means including housing top 6 with a hollow cover 25, which is hinged at its lower edge and may carry, e.g., the modulation indicator 11' and a switch 35 on its inner or upper side. When the cover is open, the indicator is readily visible from above. This is particularly desirable when the tape recorder is being operated while it is carried from the shoulder. In this case controls 10' may be mounted on the housing base 26, which is designed as a clamp provided with an articulated joint and a screw thread for connection to a stand. Alternatively, the entire top 6' may be designed to be similarly pivotally movable from the base about an axis and the switches, controls, instruments or the like may be entirely accommodated in the interior of the top 6' and only the control knobs, scales etc., be arranged on that housing wall which faces upwardly during operation. In this embodiment the housing top 6' has a perfectly smooth surface, without any projecting parts. To establish the electrical connections between the base 23 and the top 6', however, an articulated plug and socket connection is provided to facilitate the removal of the top 6' from the base 23 so that the tape recorder may also be operated in a stationary set-up.

While specific embodiments of the invention have been shown and described in detail to illustrate the application of the inventive principles, it will be understood that the invention may be embodied otherwise without departing from such principles. For instance, the invention may be applied to sound transducing devices other than tape recorders, such as sound motion picture cameras and noise level meters, amplifier-loudspeaker combinations, portable monitoring apparatus, radio equipment and the like.

The embodiments of the invention in which an exclusive property or privilege is claimed are defined as follows:

1. A portable sound transducing device comprising a body portion having electrical circuitry therein, a combination supporting and electrical coupling belt having electrical conductor means therein for electrically connecting the electrical circuitry in said body portion to an external apparatus such as a microphone, terminal means carried by said belt for detachably coupling each end of said belt to said body portion for supporting said body portion from said belt and electrically connecting said conductor means to said electrical circuitry, a control housing carried by said belt intermediate its length, control means in said control housing connected electrically to said electrical conductor means, said control housing including means thereon for electrically connecting said control means to a microphone, said control housing including a base portion secured to said belt and a detachable portion electrically and mechanically coupled to said base portion, said detachable portion having means thereon for electrically connecting a microphone thereto, and a cover hinged to said detachable portion having a modulation indicator thereon electrically connected to said control means.

2. A portable sound transducing device comprising a tape recorder body portion having electrical circuitry therein, a combination supporting and electrical coupling belt having electrical conduit means extending within said belt along the length thereof for electrically connecting the electrical circuitry in said body portion to an external apparatus such as a microphone, terminal means carried by said belt detachably coupling each end of said belt to said body portion for supporting said body portion from said belt and for electrically connecting said conductor means to said electrical circuitry, a control housing carried by said belt intermediate its length including a base portion permanently connected into said electrical conduit means and extending along a portion of said belt and a removable portion electrically and mechanically interengaged with said base portion, said removable portion having control means for regulating said sound transducing device, and plug means on said removable portion for electrically connecting said control means to a microphone, said tape recorder body portion having detachable clamping elements for clamping respective ends of said coupling belt on each side thereof, said belt having a thickened portion intermediate its length which carries said base portion.

3. A portable sound transducing device according to claim 2, wherein said removable portion has a cover pivotally connected thereto and which is pivotal from a vertical position to a horizontal position and which carries said control means, said control means including an operating switch and a regulator for regulating and controlling the operation of said microphone.

4. A portable sound transducing device comprising a body portion having electrical circuitry therein, a combination supporting and electrical coupling belt having electrical conductor means therein for electrically connecting the electrical circuitry in said body portion to an external apparatus such as a microphone, terminal means carried by each end of said belt detachably coupling each end of said belt to said body portion for supporting said body portion from said belt and for electrically connecting said conductor means to said electrical circuitry, a control housing carried by said belt intermediate its length including a base portion permanently mechanically and electrically connected to and extending along a portion of said belt and a removable portion electrically and mechanically interengaged with said base portion, said removable portion having control means for regulating said sound transducing device, and plug means on said removable portion for electrically connecting said control means to a microphone and for electrically connecting said control means to said terminal means of one end of said belt, and means for mechanically coupling said removable portion to a fixed stand.

5. A portable sound transducing device comprising a body portion having electrical circuitry therein, a combination supporting and electrical coupling belt having an electrical conductor therein with its one end engaged with said body portion for electrically connecting to the electrical circuitry in said body portion and having an opposite end with a terminal for connecting said electrical circuitry to an external apparatus such as a microphone, said belt being engageable at said opposite end with said body portion for supporting said body portion from said belt, a control housing carried by said belt intermediate its length including a base portion permanently connected to and extending along a portion of said belt and electrically connected into said electrical circuitry of said belt, said control housing including a removable portion electrically and mechanically interengaged wtih said base portion, said removable portion having control means for regulating said sound transducing device which is electrically connected onto said base portion when said removable portion is interengaged with said base portion, and plug means on said removable portion for electrically connecting said control means to a microphone and to said coupling belt terminal.

References Cited

UNITED STATES PATENTS

| | | | |
|---|---|---|---|
| 2,421,516 | 6/1947 | Mitchell | 325—16 |
| 2,541,042 | 2/1951 | Curtis | 179—57 |
| 2,571,514 | 10/1951 | Andrews | 179—57 |

FOREIGN PATENTS

| | | |
|---|---|---|
| 964,556 | 2/1950 | France. |

WILLIAM C. COOPER, *Primary Examiner.*

B. P. SMITH, *Assistant Examiner.*

U.S. Cl. X.R.

179—1